Patented Apr. 27, 1954

2,676,993

UNITED STATES PATENT OFFICE 2,676,993

POLYENE ENOL ETHERS AND METHODS OF MAKING SAME

Wilbert J. Humphlett, Rochester, N. Y., assignor to Eastman Kodak Company, Rochester, N. Y., a corporation of New Jersey No Drawing. Application September 11, 1951, Serial No. 246,163

10 Claims. (Cl. 260—611)

This invention relates to polyene enol ethers and to methods of making the same and is particularly concerned with methods of making an enol ether which is useful in synthesizing vitamin A itself.

Vitamin A alcohol has the formula

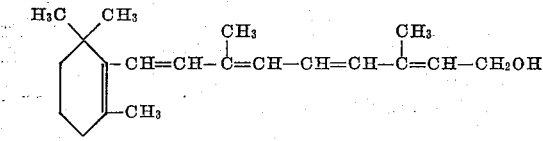

and the synthesis of vitamin A must be accomplished by building up such a complex molecule from simpler starting materials such as β-ionone or the like. Vitamin A alcohol is readily converted to vitamin A esters such as the acetate or palmitate esters by known esterification processes, the vitamin A sold commercially usually being in the ester form.

It is accordingly an object of this invention to provide polyene materials having the basic vitamin A structure and readily convertible to vitamin A.

Another object of the invention is to provide enol ethers of vitamin A aldehyde which are new compounds useful in the synthesis of vitamin A.

Another object of the invention is to provide an effective method of preparing an enol ether of vitamin A aldehyde.

Another object of the invention is to provide a simple method of converting a hydroxy polyene dialkyl acetal to a polyene enol ether.

Another object of the invention is to provide a method of converting a vitamin A diol dialkyl acetal to an enol ether having the vitamin A carbon skeleton.

Other objects will be apparent from the description and claims which follow.

The and other objects are attained by means of this invention as described more fully with reference to preferred embodiments thereof, the processes embodying the invention being effective to produce an enol ether having the formula

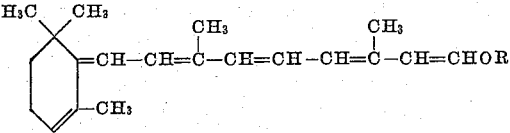

Compound I wherein R is a hydrocarbon radical preferably an alkyl radical such as methyl, ethyl, propyl, butyl or the like. Such enol ether forms a valuable intermediate in the synthesis of vitamin A since it is readily hydrolyzed and rearranged to vitamin A aldehyde which can be reduced by known methods to vitamin A alcohol.

In accordance with the present invention, the enol ether of vitamin A aldehyde (Compound I) is prepared from a hydroxy polyene acetal having the basic carbon skeleton of compounds of the vitamin A series, by heating a mixture of such hydroxy polyene acetal, in solution in a tertiary amine, with an ionizable halogenide which exhibits acidic characteristics but is free of ionizing hydrogen atoms.

The hydroxy polyene acetals which are treated in accordance with this invention have the formula

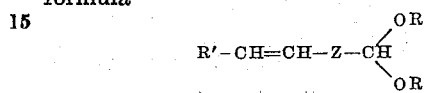

wherein Z is the group

in the case of the monohydroxy dialkyl acetals or the hydrate

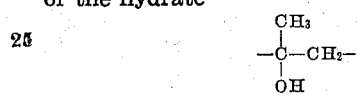

in the case of the diol acetals and R is a hydrocarbon radical. Thus R can be alkyl, aryl or aralkyl without affecting the course of the reaction. The radical R' is an ionolic radical, that is, it has the carbon skeleton of an ionone with a hydroxyl substituent on the chain; and, depending upon the process employed for their preparation as described more fully in the copending applications of Humphlett, Serial Nos. 246,164 and 246,170, of Humphlett and Burness, Serial No. 246,165, of Robeson and Lindsay, Serial No. 246,169, of Burness and Robeson, Serial No. 246,167 and of Guntrum and Robeson, Serial No. 246,166, all filed concurrently herewith, the hydroxy polyene dialkyl acetals converted in accordance with this invention include the following compounds:

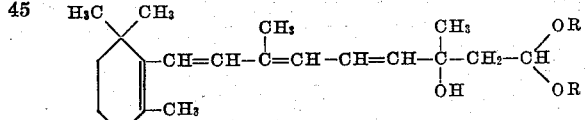

Compound II

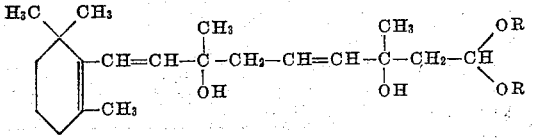

*Compound III*

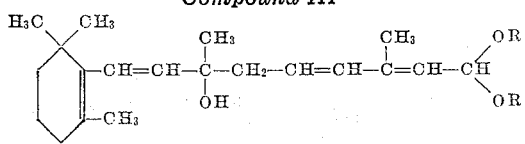

*Compound IV*

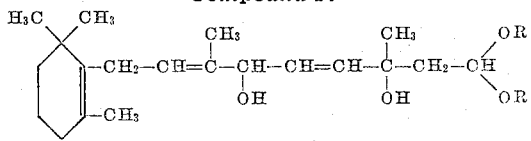

*Compound V*

Each of Compounds II to V is converted to Compound I by means of this invention.

In practising the invention, the hydroxy polyene acetal is treated with an acidic halogenide which is free of ionizable hydrogen atoms. The acidic halogenides employed are either halides or oxyhalides including such well-known acidic reagents of this type as the phosphorous halides as typified by phosphorous trichloride and phosphorous pentachloride, phosphorous oxyhalides such as phosphorous oxychloride and benzene phosphorous oxydichloride, aluminum halides such as aluminum trichloride, as well as such other well-known acidic reagents as boron trifluoride, zinc chloride, stannic chloride, and the like.

The conversion is preferably carried out in solution in a tertiary amine, the members of the pyridine series having the formula $C_nH_{2n-5}N$ being desirably employed. Typical tertiary amines which are suitable include pyridine itself, the lutidines, the picolines, piperidine, trimethylamine, ethyl dimethyl pyridine and the like. The process is desirably effected at elevated temperatures up to the reflux temperature of the solution.

The processes embodying the invention are useful in facilitating the synthesis of vitamin A through a variety of methods involving the well-known Grignard or Reformatsky reactions which yield a hydroxy polyene since, by means of this invention, any of the hydroxy polyene dialkyl acetals set out hereinabove are converted to the enol ether of vitamin A which is readily convertible to vitamin A alcohol.

Thus, for example, Compound II can be prepared by reacting β-ionone with a propargyl halide such as propargyl bromide in the presence of zinc, dehydrating the resulting propinyl carbinol to a mixture of the α- and β-cyclohexenylic acetylenic hydrocarbons, condensing such acetylenic compounds with a dialkyl acetal of β-keto-butyraldehyde by means of a Grignard reaction, and hydrogenating the acetylenic linkage to a double bond by means of hydrogen and palladium black or similar catalyst by well-known methods to give a mixture of Compound II and an isomer thereof.

Compound III is prepared in similar fashion except that the propinyl carbinol formed by condensing a propinyl halide with β-ionone is not dehydrated prior to condensation with the β-keto dialkyl acetal.

Compound IV results from condensing the propinyl halide with the β-keto dialkyl acetal and dehydrating with thionyl chloride at room temperature and condensing the resulting compound with β-ionone followed by hydrogenation of the acetylenic linkage.

Compound V is prepared by condensing acetylene with an acetal of β-ketobutyraldehyde by means of sodium acetylide or the like in accordance with known practices, condensing the resulting ethinyl carbinol with a $C_{14}$-aldehyde and partially hydrogenating the acetylenic linkage.

The conversion of such hydroxy polyene dialkyl acetals to an enol ether of vitamin A aldehyde is illustrated by the following examples of typical embodiments of the invention, it being understood that the examples are illustrative and that the enol ether preparations can be varied as to the reactants and conditions in accordance with the description and claims. In the following examples, the ultraviolet absorption data (E values) were determined in solutions in ethanol in accordance with usual practice.

EXAMPLE 1

A 6.6 ml. portion of anhydrous pyridine was placed in a 40 ml. 3-necked flask equipped with a stirrer, reflux condenser and dropping funnel. The flask was cooled and 1.10 ml. of phosphorous oxychloride in 10.1 ml. of anhydrous toluene was added, followed by the addition of a solution in 5.0 ml. of absolute toluene of 1.83 g. of 9-(2,6,6-trimethyl-1-cyclohexen-1-yl)-3,7-dihydroxy-3,7-3,7-dimethyl-1,1-dimethoxy-4,8-nonadiene (Compound III). The resulting reaction mixture was heated to 90–95° C. for 75 minutes during which time the mixture was vigorously stirred. The red reaction mixture was then cooled and stirred into 30 g. of crushed ice and ether. The aqueous phase was separated from the ether phase and the aqueous phase extracted with ether six times. The combined ether extracts were washed successively with saturated potassium carbonate solution, excess 5% sulfuric acid, saturated sodium bicarbonate solution, and water, the aqueous phase being extracted once with ether in each case. The ether extracts were then dried over anhydrous sodium sulfate, and the solvent removed by vacuum evaporation to give 1.50 g. of the enol ether (Compound I) as a red, viscous material having $$E^{1\%}_{1cm.}(372\ m\mu) = 1080$$

This product was further purified by chromatography on synthetic sodium aluminum silicate to 0.78 g. of viscous yellow product having $$E^{1\%}_{1cm.}(372\ m\mu) = 1800$$

EXAMPLE 2

To 23.5 ml. of anhydrous pyridine was added 7.1 g. of phosphorous oxychloride in 35 ml. of dry toluene. Thereafter, 6.0 g. of 9-(2,6,6-trimethyl-1-cyclohexen-1-yl)-3,7-dimethyl-3,6-dihydroxy-1,1-dimethoxy-4,7-nonadiene (Compound V) in 16.0 ml. of dry toluene was added to the reaction mixture, and the mixture was heated at 90–95° C. for 1.5 hours. After working up the product as was done in Example 1, 4.48 g. of the enol ether (Compound I) was obtained having $$E^{1\%}_{1cm.}(372\ m\mu) = 624$$

EXAMPLE 3

The monohydroxy acetal, 9-(2,6,6-trimethyl-1-cyclohexene-1-yl)-3,7-dimethyl-3-hydroxy-1,1-dimethoxy-4,6,8-nonatriene (Compound II) was converted to Compound I in similar fashion. A 1.0 g. portion of Compound II dissolved in 5 cc. of anhydrous toluene was slowly added to a solution of 0.566 g. of phosphorous oxychloride in 5 cc. of dry toluene and 1.8 cc. of dry pyridine. The reatcion mixture was heated at 90° C. for 1 hour and then poured onto ice. The mixture was then extracted with ether, and the ether extract was washed successively with 10% sulfuric acid, 0.5 N potassium hydroxide, and water. The extract was then dried over anhydrous sodium sulfate, filtered and the solvent removed by evaporation to give 0.74 g. of Compound I as a viscous oil having $$E_{1cm.}^{1\%} (369\ m\mu) = 907$$

EXAMPLE 4

A mixture of 7 ml. of pyridine and 10 ml. of anhydrous toluene containing 2.7 g. of benzene phosphorous oxydichloride was charged into a 50 ml. flask equipped with a stirrer and a condenser. To this mixture was added 5 ml. of anhydrous toluene containing 1.83 g. of 9-(2,6,6-trimethyl-1-cyclohexen-1-yl)-3,7-dihydroxy-3,7-dimethyl-1,1-dimethoxy-4,8-nonadiene. The resulting reaction mixture was heated at 90–95° C. for 1¼ hours and then poured onto 20 g. of cracked ice. The aqueous phase was made basic with potassium carbonate and then extracted three times with ether. The ether extracts were combined and washed successively with potassium carbonate solution, 10% sulfuric acid, saturated sodium bicarbonate solution and water. The extract was then dried over anhydrous sodium sulfate and the solvent removed by evaporation to give 1.27 g. of the enol ether of vitamin A aldehyde having $$E_{1cm.}^{1\%} (372\ m\mu) = 790$$

Other hydroxy polyene dialkyl acetals as defined herein are converted to the corresponding enol ethers of vitamin A aldehyde in similar fashion using the other well-known acidic halides and oxyhalides as described in the specification.

The invention thus provides an effective method of converting hydroxy acetals of the vitamin A series to an enol ether in a single reaction and in high yield.

While the invention has been described in considerable detail with reference to certain preferred embodiments, it will be understood that variations and modifications can be effected within the spirit and scope of the invention as described hereinabove and as defined in the appended claims.

I claim:

1. In the synthesis of vitamin A, the method of preparing an enol ether having the formula

[Structural formula: 2,6,6-trimethylcyclohexenyl group with side chain =CH—CH=C(CH₃)—CH=CH—CH=C(CH₃)—CH=CHOR]

wherein R is a member of the group consisting of alkyl, aryl and aralkyl groups, which comprises heating together under anhydrous conditions a mixture of an ionizable acidic halogenide free of ionizing hydrogen atoms and being selected from the class consisting of halides and oxyhalides, and a solution, in a tertiary amine, of a hydroxy polyene acetal of the formula $$R'-CH=CH-Z-CH{\overset{OR}{\underset{OR}{\diagdown}}}$$

wherein R is a member of the group consisting of alkyl, aryl and aralkyl groups, R' is an ionylic radical selected from the group consisting of

[Structural formula: 2,6,6-trimethylcyclohexenyl—CH=CH—C(CH₃)=CH—]

and

[Structural formula: 2,6,6-trimethylcyclohexenyl—CH=CH—C(CH₃)—CH₂—C(CH₃)(OH)—CH₃]

and

[Structural formula: 2,6,6-trimethylcyclohexenyl—CH₂—CH=C(CH₃)—CH—C(CH₃)(OH)—CH₃]

and Z is a radical selected from the group consisting of $$-\underset{\text{CH}_3}{\overset{|}{C}}=CH-$$

and its hydrate $$-\underset{\text{OH}}{\overset{\text{CH}_3}{\underset{|}{C}}}-CH_2-$$

2. In the synthesis of vitamin A, the method of preparing an enol ether of vitamin A aldehyde having the formula

[Structural formula: 2,6,6-trimethylcyclohexenyl =CH—CH=C(CH₃)—CH=CH—CH=C(CH₃)—CH=CHOR]

wherein R is an alkyl radical, which comprises heating together under anhydrous conditions a mixture of an acidic halide free of ionizing hydrogen atoms, and a solution, in a tertiary amine, of a hydroxy polyene dialkyl acetal of the formula $$R'-CH=CH-Z-CH{\overset{OR}{\underset{OR}{\diagdown}}}$$

wherein R' is an ionylic radical selected from the group consisting of

[Structural formula: 2,6,6-trimethylcyclohexenyl—CH=CH—C(CH₃)=CH—]

[Structural formula: 2,6,6-trimethylcyclohexenyl—CH=CH—C(CH₃)—CH₂—C(CH₃)(OH)—]

and

[Structural formula: 2,6,6-trimethylcyclohexenyl—CH₂—CH=C(CH₃)—CH—C(CH₃)(OH)—]

and Z is a radical selected from the group consisting of $$-\underset{\text{CH}_3}{\overset{|}{C}}=CH-$$

and its hydrate $$-\underset{\text{OH}}{\overset{\text{CH}_3}{\underset{|}{C}}}-CH_2-$$

3. In the synthesis of vitamin A, the method of preparing an enol ether having the formula

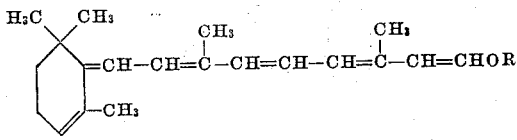

wherein R is an alkyl radical, which comprises heating together under anhydrous conditions a mixture of an acidic oxyhalide free of ionizing hydrogen atoms, and a solution, in a tertiary amine, of a hydroxy polyene dialkyl acetal of the formula $$R'-CH=CH-Z-CH{<}^{OR}_{OR}$$

wherein R' is an ionylic radical selected from the group consisting of

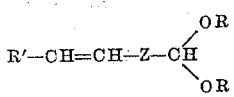

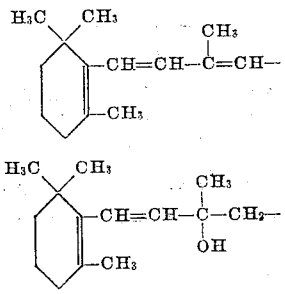

and Z is a radical selected from the group consisting of

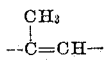

and its hydrate

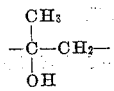

4. In the synthesis of vitamin A, the method of preparing an enol ether having the formula

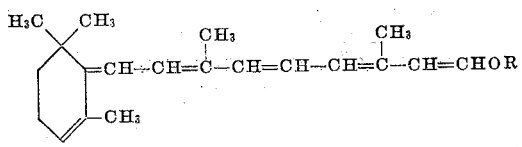

wherein R is an alkyl radical, which comprises heating together under anhydrous conditions a mixture of phosphorous oxychloride, and a solution, in a tertiary amine, of a hydroxy polyene dialkyl acetal of the formula $$R'-CH=CH-Z-CH{<}^{OR}_{OR}$$

wherein R' is an ionylic radical selected from the group consisting of

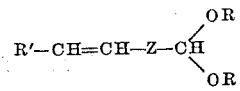

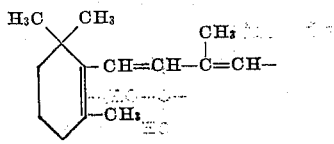

and Z is a radical selected from the group consisting of

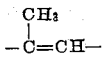

and its hydrate

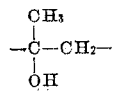

5. In the synthesis of vitamin A, the method of preparing an enol ether having the formula

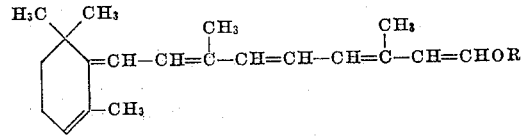

wherein R is an alkyl radical, which comprises heating together under anhydrous conditions a mixture of a phosphorous chloride, and a solution, in a tertiary amine, of a hydroxy polyene dialkyl acetal of the formula $$R'-CH=CH-Z-CH{<}^{OR}_{OR}$$

wherein R' is an ionylic radical selected from the group consisting of

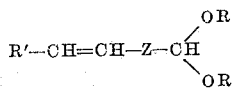

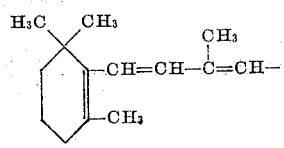

and Z is a radical selected from the group consisting of

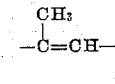

and its hydrate

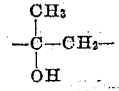

6. In the synthesis of vitamin A, the method of preparing an enol ether having the formula

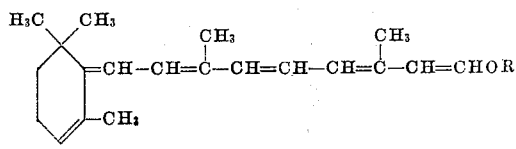

wherein R is an alkyl radical, which comprises heating together under anhydrous conditions a mixture of phosphorous oxychloride, and a solution, in pyridine, of a hydroxy polyene dialkyl acetal of the formula

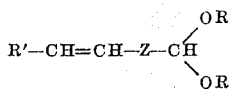

wherein R' is an ionylic radical selected from the group consisting of

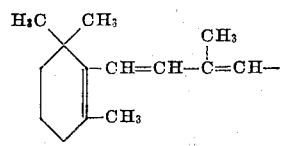

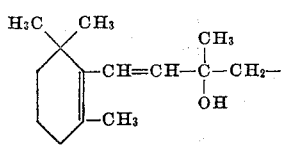

and

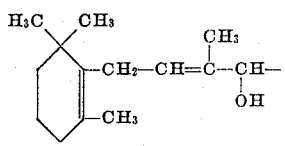

and Z is a radical selected from the group consisting of

and its hydrate

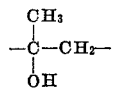

7. In the synthesis of vitamin A, the method of preparing an enol ether having the formula

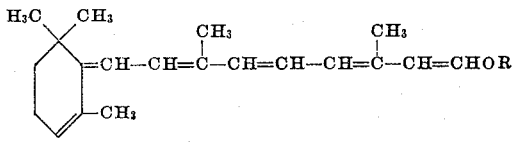

wherein R is an alkyl radical, which comprises heating under anhydrous conditions a mixture of an ionizable acidic material free of ionizing hydrogen atoms and selected from the class consisting of halides and oxyhalides and a solution, in a tertiary amine, of a polyene diol dialkyl acetal of the formula

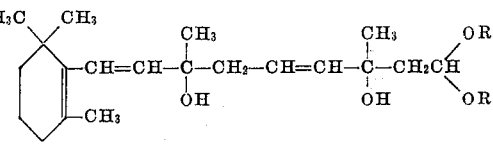

and thereby converting said polyene diol dialkyl acetal to said enol ether.

8. In the synthesis of vitamin A, the method of preparing an enol ether having the formula

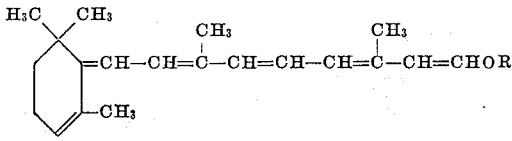

wherein R is an alkyl radical, which comprises heating under anhydrous conditions a mixture of an ionizable acidic material free of ionizing hydrogen atoms and selected from the class consisting of halides and oxyhalides and a solution, in a tertiary amine, of a polyene diol dialkyl acetal of the formula

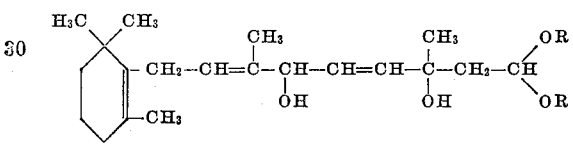

and thereby converting said polyene diol dialkyl acetal to said enol ether.

9. A compound useful in the synthesis of vitamin A and having the formula

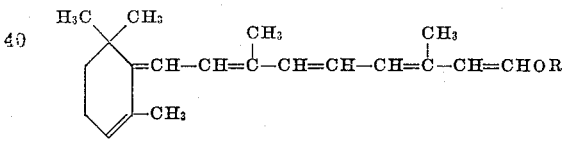

wherein R is a member of the group consisting of alkyl, aryl and aralkyl groups.

10. A compound useful in the synthesis of vitamin A and having the formula

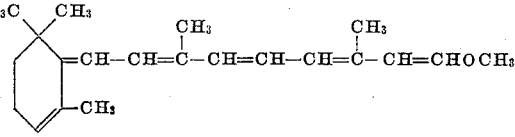

References Cited in the file of this patent

UNITED STATES PATENTS

| Number | Name | Date |
|---|---|---|
| 2,586,305 | Copenhaver | Feb. 19, 1952 |